United States Patent
Phang

(10) Patent No.: US 9,872,447 B2
(45) Date of Patent: Jan. 23, 2018

(54) AUTOMATIC WATERING DEVICE

(71) Applicant: Nam S. Phang, Dublin, CA (US)

(72) Inventor: Nam S. Phang, Dublin, CA (US)

( * ) Notice: Subject to any disclaimer, the term of this patent is extended or adjusted under 35 U.S.C. 154(b) by 103 days.

(21) Appl. No.: 14/799,332

(22) Filed: Jul. 14, 2015

(65) Prior Publication Data
US 2016/0014985 A1    Jan. 21, 2016

Related U.S. Application Data

(60) Provisional application No. 62/025,502, filed on Jul. 17, 2014.

(51) Int. Cl.
*A01G 27/00* (2006.01)
*A01G 27/04* (2006.01)

(52) U.S. Cl.
CPC ........... *A01G 27/04* (2013.01); *A01G 27/006* (2013.01); *A01G 27/008* (2013.01)

(58) Field of Classification Search
CPC ........ A01G 27/00; A01G 27/02; A01G 27/04; A01G 27/06; A01G 27/001; A01G 27/006; A01G 27/008
USPC .................................................. 47/48.5, 81
See application file for complete search history.

(56) References Cited

U.S. PATENT DOCUMENTS

| | | | | |
|---|---|---|---|---|
| 2,495,230 A * | 1/1950 | Day | ........................ | F24C 5/18 137/578 |
| 2,747,332 A * | 5/1956 | Morehouse | ............ | A01G 27/06 239/44 |
| 3,739,524 A * | 6/1973 | Rose | ....................... | A01G 27/04 116/228 |
| 4,117,632 A | 10/1978 | Pearce | | |
| 4,223,837 A | 9/1980 | Gubbiotti | | |
| 4,741,125 A | 5/1988 | Demorest | | |
| 4,843,758 A * | 7/1989 | Raczkowski | ........ | A01G 27/008 47/48.5 |
| 4,916,858 A | 4/1990 | Hobson | | |
| 5,836,106 A * | 11/1998 | Alex | ..................... | A01G 27/005 47/48.5 |
| 5,896,700 A * | 4/1999 | McGough | ............ | A01G 27/006 47/48.5 |
| 6,226,921 B1 | 5/2001 | Kang | | |
| 6,321,487 B1 * | 11/2001 | Sardanelli | .............. | A01G 27/04 47/81 |
| 8,528,252 B2 | 9/2013 | Griebel | | |
| 2014/0306031 A1* | 10/2014 | Onyeka | ................ | A01G 27/006 239/289 |

FOREIGN PATENT DOCUMENTS

| | | | | |
|---|---|---|---|---|
| EP | 0692186 A1 | 1/1996 | | |
| EP | 1900275 A1 | 3/2008 | | |
| FR | 2569943 A1 * | 3/1986 | ........... | A01G 27/008 |
| WO | WO-89/11788 | 12/1989 | | |

* cited by examiner

*Primary Examiner* — David Parsley
*Assistant Examiner* — Danielle Clerkley
(74) *Attorney, Agent, or Firm* — Blank Rome LLP; Michael C. Greenbaum

(57) ABSTRACT

The invention relates to an automatic watering device which is self-contained, free standing, portable and easy to install. The automatic water device has at least one reservoir, at least one float, at least one conduit, and at least one base spike and enables the automatic watering device to dispense liquid at a regulated and constant rate by the principle of capillary action or wicking.

17 Claims, 6 Drawing Sheets

AUTOMATIC WATERING DEVICE

FIELD OF THE INVENTION

The invention is directed to an automatic watering device, such as a device for watering plants, flowers, vegetables, and the like. The automatic watering device is capable of dispensing liquid at a regulated and constant rate by capillary action or wicking.

BACKGROUND OF THE INVENTION

It is often desirable for plants to be watered by automatic self-watering devices that are able to dispense liquid (e.g., water) at a regulated and constant rate over a period of time. This applies to a variety of situations, including that the owner may be too busy to water the plants regularly or that the plants need to be left unattended for an extended period of time, such as when the owner is away from his home or office.

Conventional self-watering devices apply the principle of capillary action or wicking and typically consist of a watering wick, one end of which is immersed in a container filled with liquid and the other end of which is exposed to the area to be watered (i.e., the soil or growing medium). However, as liquid is drawn to the growing medium, the liquid level in the container drops and the wicking height, which is the height that the liquid needs to be lifted up against gravity, increases. As the wicking height progressively increases, the efficiency of the capillary action steadily becomes less efficient, the flow rate diminishes, and wicking eventually ceases. This is a major drawback and presents a limitation in the application of the liquid wick in a self-watering device.

Further, most of these conventional self-watering devices utilize wicking systems that incorporate the wicks within the bodies of the pots containing the plants and the growing media. Such self-watering planters or pots are disadvantaged by the fact that, should the wicks need to be replaced due to clogging or the device need to be serviced, the plants and the growing media may have to be disturbed or even excavated.

SUMMARY OF THE INVENTION

The claimed automatic watering device overcomes these drawbacks by incorporating a float in the watering device to which a wick is coupled. The float is designed to move freely in tandem with the liquid level in a reservoir, thereby enabling the wick to maintain steady constant height above the liquid level. The wicking height is thus maintained at a constant level throughout the cycle of watering, which allows the watering device to discharge the liquid at a regulated constant rate and to dispense the full capacity of the liquid in the reservoir. Moreover, the replacement of the wick in the watering device is easy and convenient without requiring the use of any tools.

The invention is directed to an automatic watering device for watering plants having at least one reservoir having a body having a top portion and a bottom portion, an exit neck coupled to the bottom portion of the body of the reservoir, at least one base spike coupled to the exit neck, at least one float housed within the body of the reservoir and having at least one wick assembly, and at least one conduit having two opposing ends, one end coupled to the at least one float and the opposing end coupled to the exit neck. The automatic watering device utilizes capillary action to water the plants.

In another embodiment, the invention is directed to an automatic watering device for watering plants having a reservoir, a plurality of floats housed within the reservoir, a plurality of wick assemblies, each of which is housed within each of the plurality of floats, a plurality of base spikes, and a plurality of conduits each having two opposing ends, one end of each conduit being coupled to one of the plurality of floats and the opposing end of each conduit being coupled to one of the plurality of base spikes. The automatic watering device utilizes capillary action to water a plurality of separate and discrete plants.

The invention is further directed to a method of watering plants, the method achieved by providing an automatic watering device which has at least one reservoir having a body having a top portion and a bottom portion, an exit neck coupled to the bottom portion of the body of the reservoir, at least one base spike coupled to the exit neck, at least one float housed within the body of the reservoir, at least one wick assembly having a wick, the wick assembly housed within the float, and at least one conduit having two opposing ends, one end coupled to the at least one float and the opposing end coupled to the exit neck. The reservoir is then filled with liquid, such that liquid is conveyed through the wick assembly via capillary action and is expelled through the base spike into a growing medium to water the plants.

BRIEF DESCRIPTIONS OF DRAWINGS

A more complete appreciation of the invention and many of the attendant advantages thereof will be readily obtained as the same becomes better understood by reference to the following detailed description when considered in connection with the accompanying drawings, FIG. 1 is a front plan view of an automatic watering device according to an embodiment of the invention;

FIG. 2. is a cross-sectional front view of the automatic watering device illustrated in FIG. 1 according to an embodiment of the invention;

DETAILED DESCRIPTION

Figure 1:
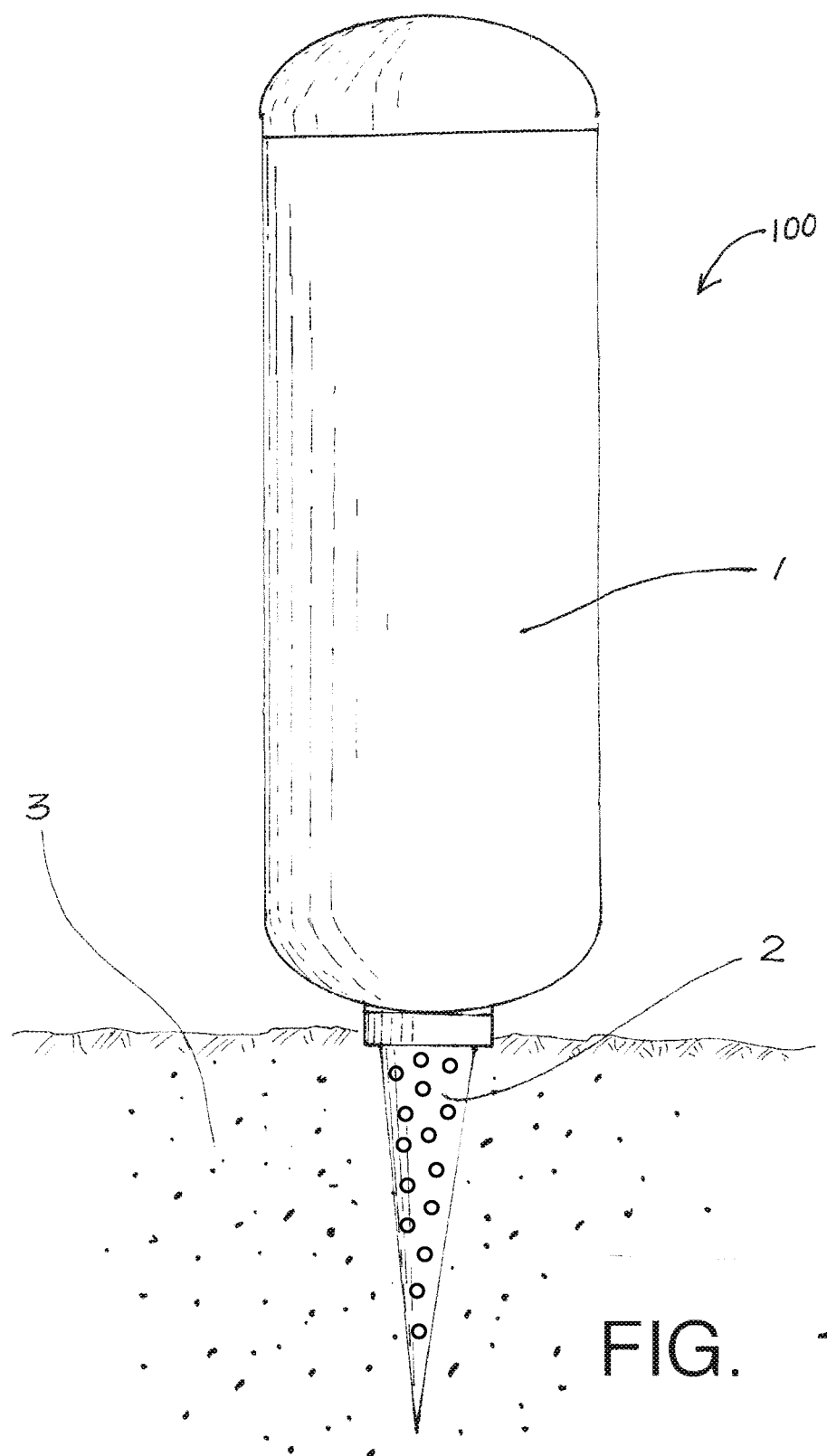
Figure 2:
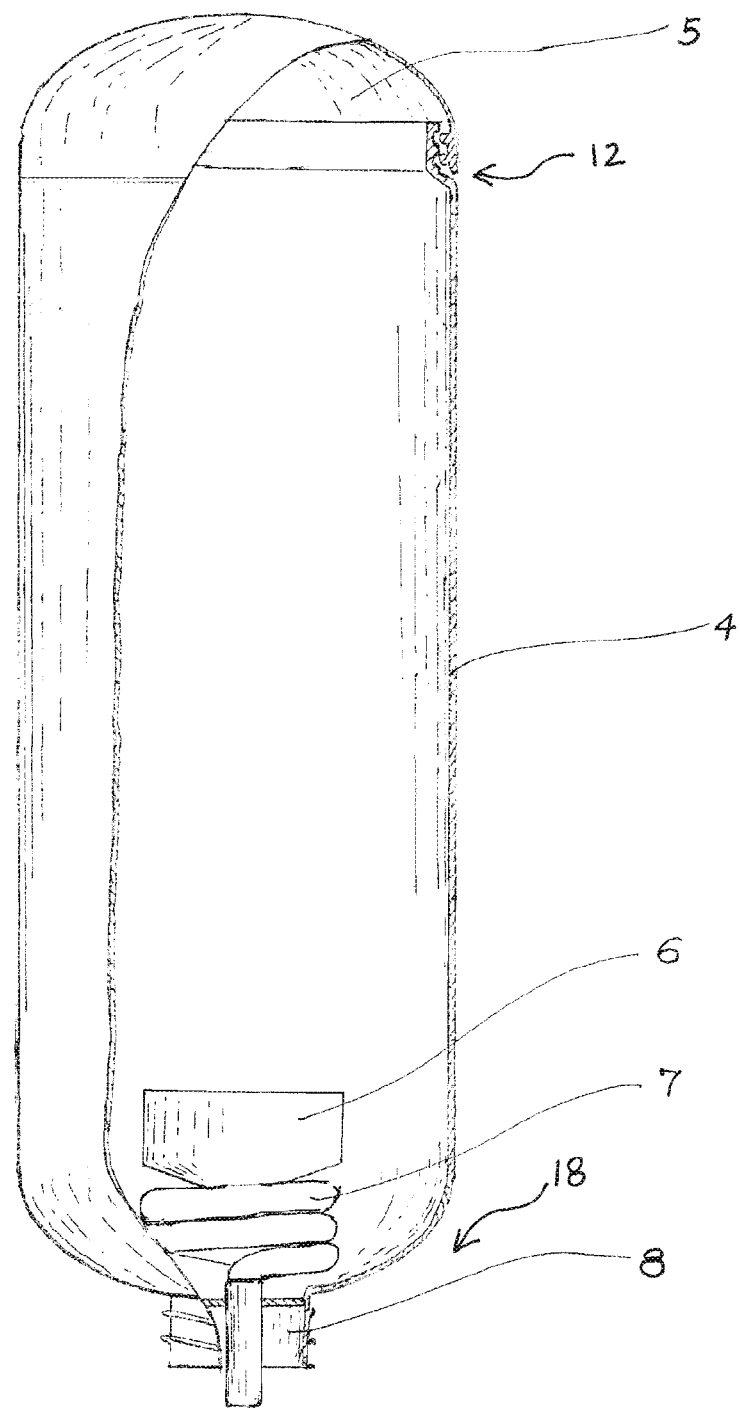
Figure 3:
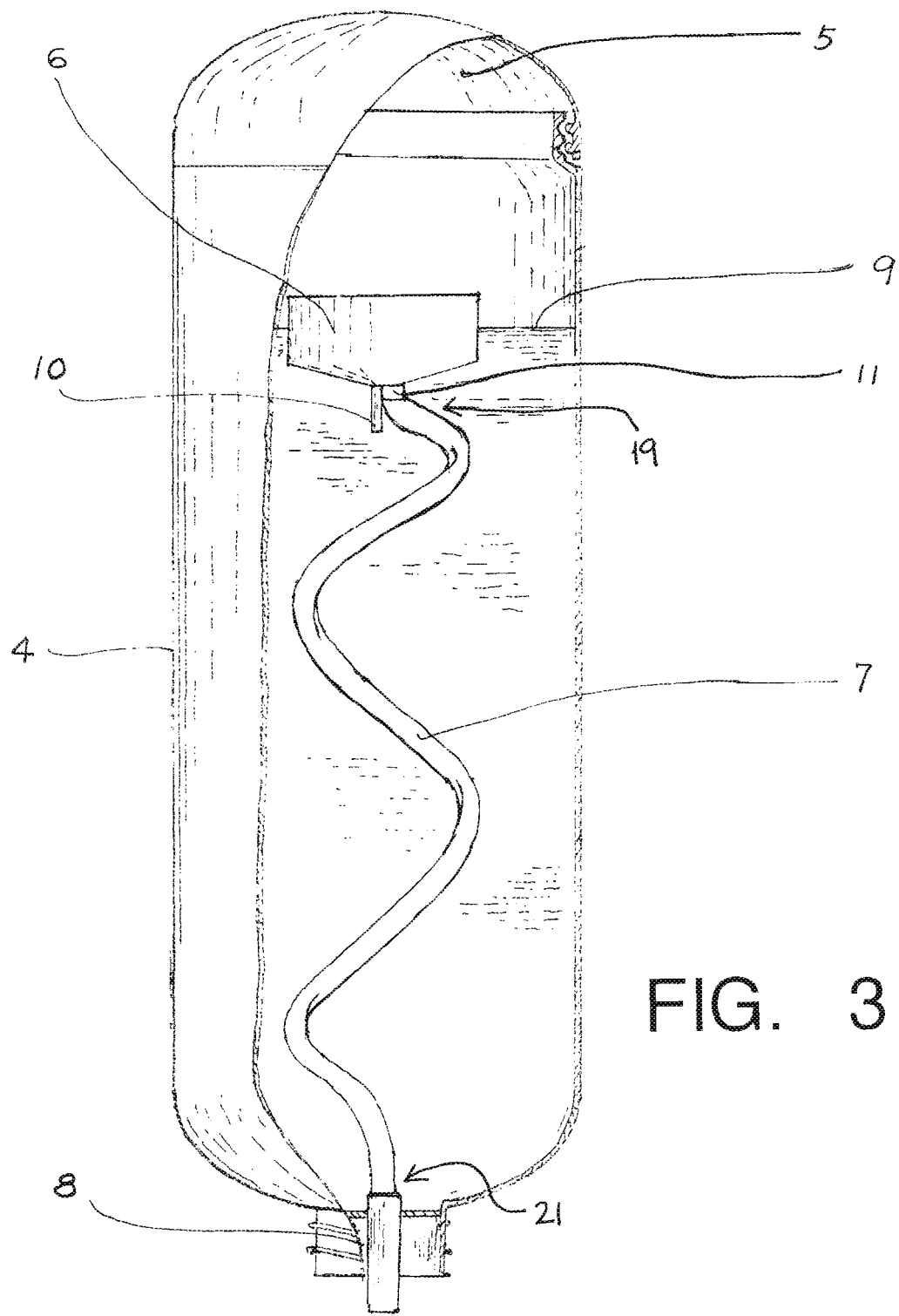
FIG. 3 is a cross-sectional front view of the automatic watering device illustrated in FIG. 1, with the reservoir filled with water in accordance with an embodiment of the invention.

Referring to FIGS. 1-3, the automatic watering device 100 of the invention generally includes at least one reservoir 1, at least one base spike 2, at least one float 6, and at least one conduit 7. As shown in these Figures, the automatic watering device 100 includes one reservoir 1, one base spike 2, one float 6, and one conduit 7.

In one embodiment, the reservoir 1 is preferably a watertight refillable container having a body 4 having a top portion 12 and a bottom portion 18, a detachable filling cap 5 coupled to the top portion 12 of the body 4, and an exit neck 8 coupled to the bottom portion 18 of the body 4. The body 4 of the reservoir 1 may be formed of any shape and design, including, but not limited to, ornamental shapes such as realistic hollow rocks, tree logs, animals, fictional characters or purely utilitarian shapes such as bottles or cylinders. The reservoir 1 may be constructed of any impermeable or non-pliant materials, including but not limited, to plastics, ceramics, glass or metal. The reservoir 1 may be of any volume suitable for the particular application. Preferably, the reservoir 1 is formed of a water-tight cylindrical shape plastic container.

Referring to FIG. 1, the base spike 2 is preferably formed of a hollow conical-shaped component that is coupled to the exit neck 8 of the reservoir 1. In one embodiment, the base spike 2 is engaged with the exit neck 8 of the reservoir 1 via a threaded arrangement. In another embodiment, the base spike 2 is engaged with the exit neck 8 by a spigot and socket design. The base spike 2 supports the reservoir 1 and engages it firmly with the growing medium 3 (e.g., soil). The base spike 2 preferably has punctures on an external surface thereof (not shown) from which the liquid in the reservoir 1 is released to the growing medium 3. The base spike 2 is preferably formed of any plastic or non-pliant materials. In one embodiment, the base spike 2 is easily detachable from the reservoir 1.

Referring to FIGS. 2-3, the float 6 may be any buoyant object that may be attached to and hold a wick assembly 10 (discussed below) firmly in place and maintain the wick 13 (see FIG. 4) at a steady constant height above a liquid level 9 in the reservoir 1 at all times throughout the course of operation of the watering device 100. The float 6 preferably has an exit port 11 on its bottom surface. As discussed herein, a conduit 7 is coupled to the float 6 at the exit port 11. The float 6 is designed to move freely inside the body 4 of the reservoir 1. The float 6 may be formed of any suitable shape and impermeable non-pliant material. In a preferred embodiment, the float 6 is made of a solid mass of buoyant material, either natural or synthetic, such as that depicted in FIG. 5. In another preferred embodiment, the float 6 can be formed of any air trapped buoyant hollow body or a floatation device, such as that depicted in FIG. 4. In the latter embodiment, the float 6 is formed of a buoyant hollow body that internally incorporates a wick receptacle 14, the wick assembly 10, a float chamber 15, and the exit port 11. In one embodiment, one float 6 may include a plurality of wick assemblies 10 in one or more wick housings.

Figure 6:
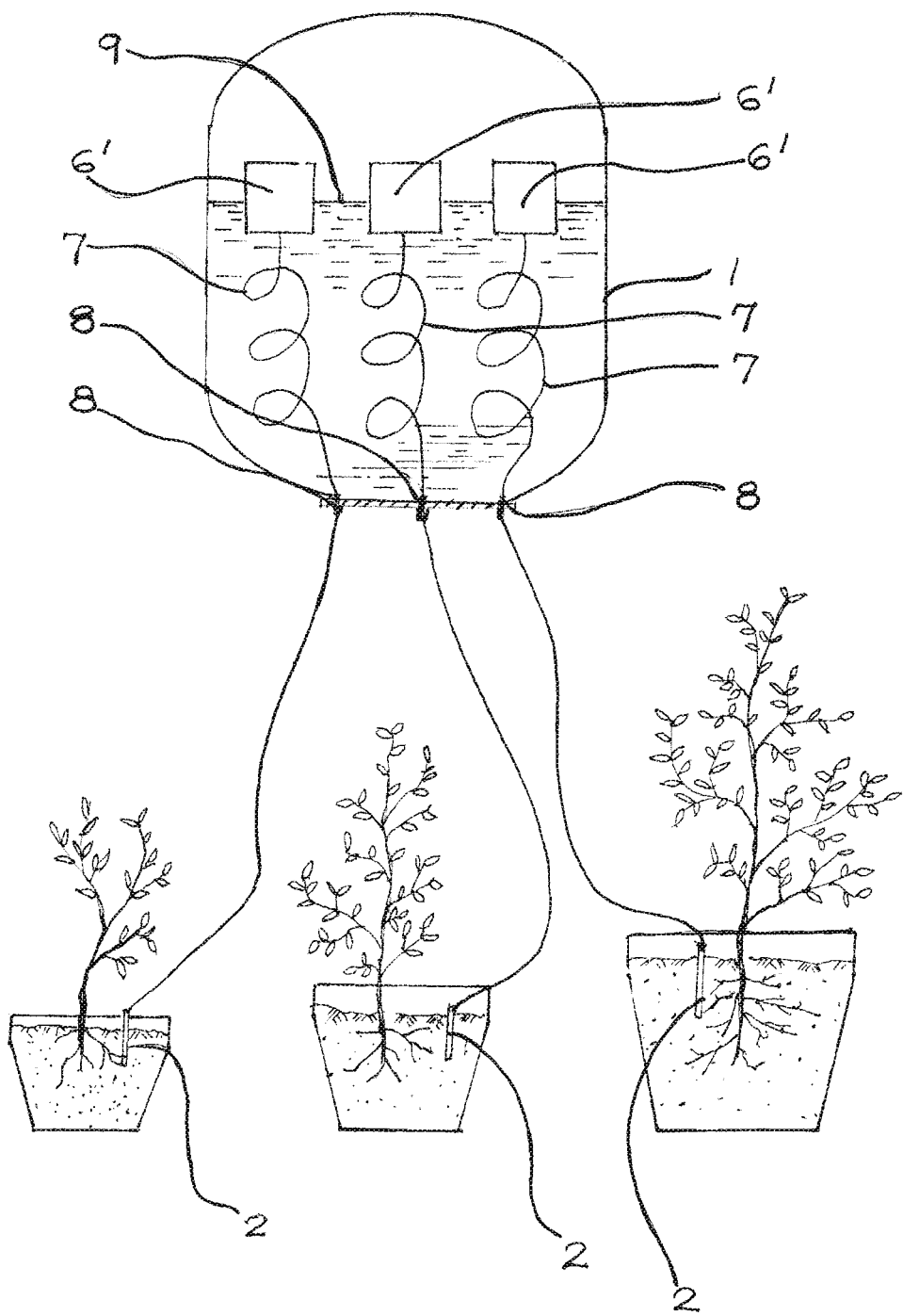
FIG. 6 is a cross-section front view of an automatic watering device having a plurality of floats in accordance with an embodiment of the invention.

As illustrated in FIG. 6, the watering device 100 may include more than one float 6 in a single reservoir 1 each with its own conduit 7 and exit neck 8. The individual floats 6' may be dispensing liquid at the same or varying rates. In this manner, a single watering device 100 can automatically water a number of plants with the same or different watering rates simultaneously.

Figure 4:
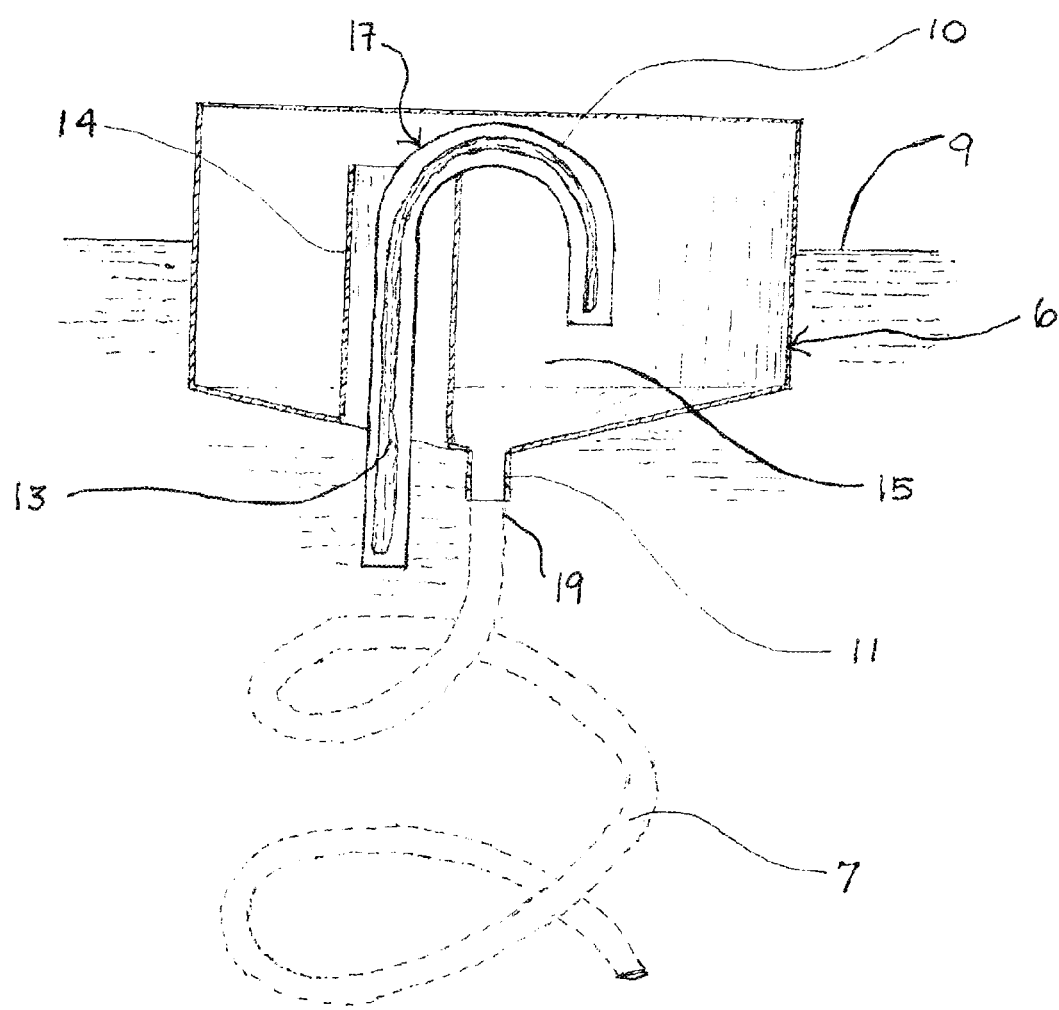
FIG. 4 is a cross-sectional view of a hollow float in accordance with an embodiment of the invention.
Figure 5:
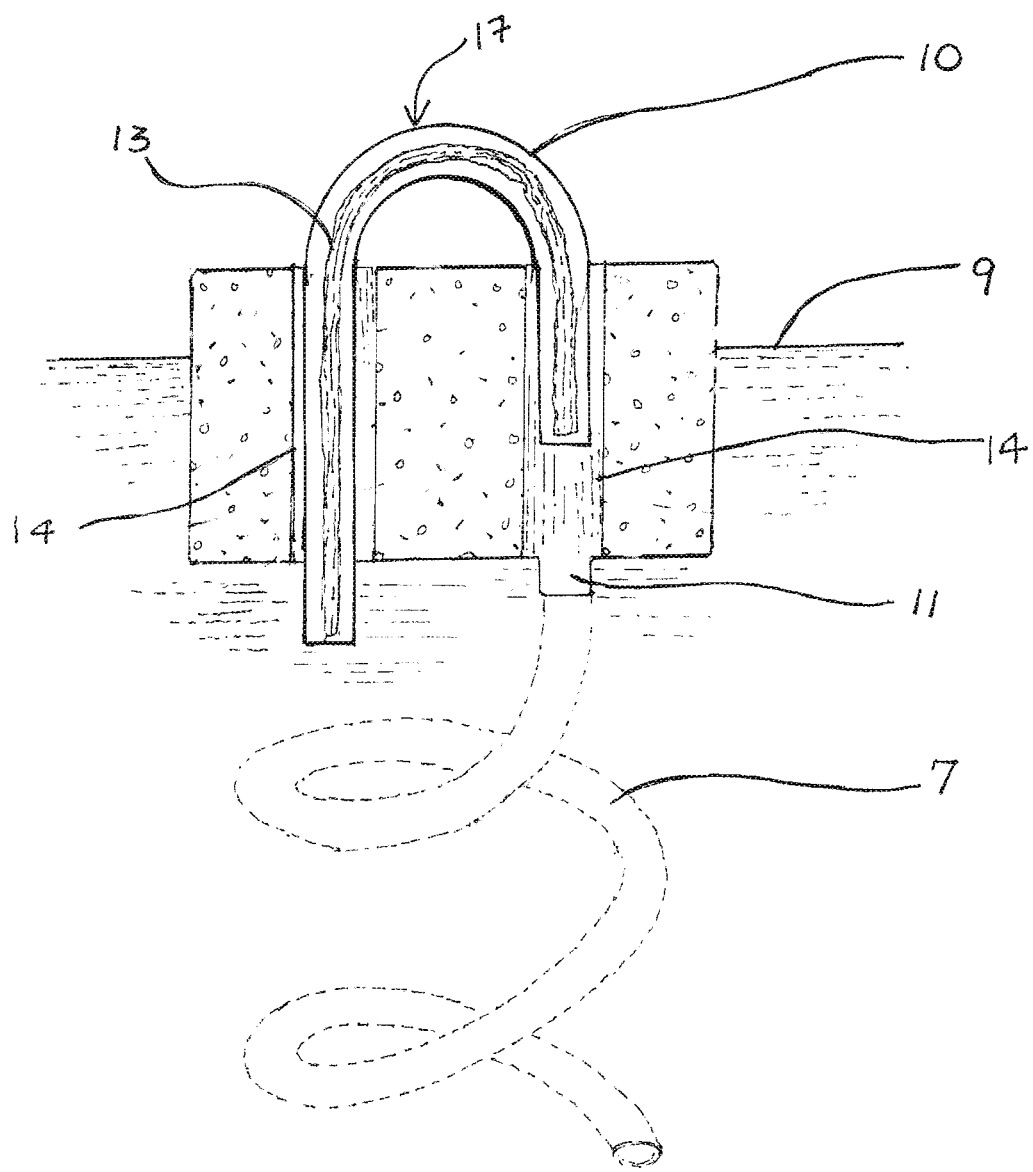
FIG. 5 is a cross-sectional view of a buoyant float without a chamber in accordance with an embodiment of the invention.

Referring to FIGS. 4-5, the wick assembly 10 generally includes an open-ended U-shaped tubular conduit 17 that houses a wick 13. The wick 13 may be formed of any suitable natural or synthetic material, such as cotton, fiberglass, or polyester. Other materials capable of performing capillary actions may also be used as the wick 13, such as micro-capillary tubes. The type of material, the cross sectional area, and the height above the liquid level of the wick 13 will determine the rate of wicking. The wick assembly 10 is preferably nested inside the wick receptacle 14, which is an open-ended tube allowing one end of the wick assembly 10 to be in contact with the liquid in the body 4 of the reservoir 1. In this way, the wick assembly 10 is easily accessible and replacement of the wick 13 is easy and convenient without requiring the use of any tools. The wick receptacle 14 may contain more than one wick assembly 10 depending on the required rate of discharge of the watering device 100. In one embodiment (not shown), the device 100 may include more than one wick receptacle 14 in the float 6, each containing one or more wick assemblies 10. The watering device 100 may utilize wick assemblies 10 of different heights, wick sizes, and materials in order to vary the rate of watering easily and conveniently.

In operation, the liquid (e.g., water) is filled into the reservoir 1 from the top portion 12 of the body 4 by removing the filling cap 5. The liquid in the reservoir 1 is then wicked, via the wick assembly 10, into a float chamber 15 by way of capillary action. The liquid is collected at the base of the float 6 at the exit port 11. From the exit port 11, the liquid enters the conduit 7.

As shown in FIG. 3, the conduit 7 is formed of hollow flexible coiled tubing, one end 19 of which is connected to the exit port 11, and the other end 21 of which is connected to the exit neck 8. The conduit 7 may be made of any flexible and pliable material, such as natural or synthetic polymers. The conduit 7 is not limited to having a flexible coiled tubing shape and may be formed into any shape or design, such as, for example, an accordion structured collapsible tube or any other shape through which the liquid can be transported gravitationally with minimal impediment to the movement of the float(s) 6. In a preferred embodiment, the conduit 7 is a coiled, flexible tube. The liquid that is collected at the float 6 is channeled gravitationally through the exit port 11, into the conduit 7 and through the exit neck 8. From the exit neck 8, the liquid discharges to the growing medium 3 via the base spike 2.

The watering device 100 is preferably installed adjacent to the plant root system. However, situations may necessitate that the watering device 100 be installed remotely from the plant, such as due to space constraints. By detaching the base spike 2 from the reservoir 1 and inserting it into the growing medium 3 adjacent to the plant, and coupling one end 21 of the conduit 7 (of appropriate length) into the base spike, the plant can be watered with the device located remotely from it, as illustrated in FIG. 6.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended Claims.

What is claimed:

1. An automatic watering device for watering plants, comprising:
    at least one reservoir having a body having a top portion and a bottom portion;
    an exit neck coupled to the bottom portion of the body of the reservoir; at least one base spike coupled to the exit neck;
    at least one float housed within the body of the reservoir comprising at least one wick assembly; and
    at least one conduit having two opposing ends, one end coupled to the at least one float and the opposing end coupled to the exit neck,
    wherein the automatic watering device utilizes capillary action to water the plants, wherein the at least one wick assembly includes a U-shaped tubular conduit that is positioned inside of the at least one float with one end extending through the bottom of the at least one float into the at least one reservoir, wherein the at least one float has an exit portion on a bottom surface thereof, and wherein the at least one conduit is coupled to the at least one float at the exit port.

2. The automatic watering device of claim 1, further comprising a detachable filling cap coupled to the top portion of the body of the reservoir.

3. The automatic watering device of claim 1, wherein the at least one reservoir is formed of an impermeable or non-pliant material.

4. The automatic watering device of claim 1, wherein the at least one base spike has hollow conical shape.

5. The automatic watering device of claim 1, wherein the at least one base spike is detachable from the reservoir.

6. The automatic watering device of claim 1, wherein the at least one float is formed of a solid mass of buoyant material or a buoyant hollow body.

7. The automatic watering device of claim 1, wherein the at least one wick assembly comprises a wick housed within a tubular conduit.

8. The automatic watering device of claim 7, wherein the wick is formed of cotton, fiberglass or polyester, and/or is a micro-capillary tube.

9. The automatic watering device of claim 1, wherein the at least one wick assembly is nested inside of a wick receptacle.

10. The automatic watering device of claim 1, wherein the at least one float comprises a plurality of wick receptacles each having at least one of the wick assemblies.

11. The automatic watering device of claim 1, wherein the automatic watering device includes a plurality of floats in one reservoir.

12. The automatic watering device of claim 1, wherein the at least one conduit is formed of a hollow flexible coiled tubing.

13. The automatic watering device of claim 1, wherein the at least one base spike has punctures on an external surface thereof.

14. The automatic watering device of claim 1, wherein the at least one float maintains the at least one wick assembly at a constant height above a liquid level in the at least one reservoir.

15. An automatic watering device for watering plants, comprising:
    at least one reservoir having a body having a top portion and a bottom portion;
    an exit neck coupled to the bottom portion of the body of the reservoir; at least one base spike coupled to the exit neck;
    at least one float housed within the body of the reservoir comprising at least one wick assembly; and
    at least one conduit having two opposing ends, one end coupled to the at least one float and the opposing end coupled to the exit neck,
    wherein the automatic watering device utilizes capillary action to water the plants, wherein the at least one wick assembly includes a U-shaped tubular conduit that is positioned inside of the at least one float with one end extending through the bottom of the at least one float into the at least one reservoir, and
    wherein the at least one float is formed of a hollow body that houses at least one wick receptacle, the at least one wick assembly, and a float chamber.

16. An automatic watering device for watering plants, comprising:
    a reservoir;
    a plurality of floats housed within the reservoir,
    a plurality of wick assemblies, each wick assembly of the plurality of wick assemblies is housed within a respective float of the plurality of floats;
    a plurality of base spikes; and
    a plurality of conduits, each conduit of the plurality of conduits having two opposing ends, one end of each conduit being coupled to one of the plurality of floats and the opposing end of each conduit being coupled to one of the plurality of base spikes,
    wherein the automatic watering device utilizes capillary action to water a plurality of separate and discrete plants.

17. A method of watering plants, comprising the steps of:
    providing an automatic watering device comprising:
        at least one reservoir having a body having a top portion and a bottom portion;
        an exit neck coupled to the bottom portion of the body of the at least one reservoir;
        at least one base spike coupled to the exit neck;
        at least one float housed within the body of the at least one reservoir; at least one wick assembly comprising a wick, the at least one wick assembly housed within the at least one float; and
        at least one conduit having two opposing ends, one end coupled to the at least one float and the opposing end coupled to the exit neck; and
    filling the at least one reservoir with liquid,
    wherein the liquid is wicked through the wick in the at least one wick assembly via capillary action and is expelled through the at least one base spike into a growing medium to water the plants,
    wherein the at least one wick assembly includes a U-shaped tubular conduit that is positioned inside of the at least one float with one end extending through the bottom of the at least one float into the at least one reservoir,
    wherein the at least one float has an exit portion on a bottom surface thereof, and
    wherein the at least one conduit is coupled to the at least one float at the exit port.

* * * * *